US010583406B2

(12) United States Patent
Koyuncu et al.

(10) Patent No.: US 10,583,406 B2
(45) Date of Patent: Mar. 10, 2020

(54) MANUFACTURING OF A NANOFIBER FORWARD OSMOSIS MEMBRANE WITH TUBULAR SHAPE

(71) Applicant: ISTANBUL TEKNIK UNIVERSITESI REKTORLUGU, Istanbul (TR)

(72) Inventors: Ismail Koyuncu, Istanbul (TR); Serkan Guclu, Istanbul (TR); Murat Eyvaz, Kocaeli (TR); Taha Aslan, Istanbul (TR); Serkan Arslan, Kocaeli (TR); Ayse Yuksekdag, Istanbul (TR); Ebubekir Yuksel, Kocaeli (TR)

(73) Assignee: ISTANBUL TEKNIK UNIVERSITESI REKTORLUGU, Ankara (TR)

( * ) Notice: Subject to any disclaimer, the term of this patent is extended or adjusted under 35 U.S.C. 154(b) by 206 days.

(21) Appl. No.: 15/555,552

(22) PCT Filed: Nov. 1, 2016

(86) PCT No.: PCT/TR2016/050411
§ 371 (c)(1),
(2) Date: Sep. 5, 2017

(87) PCT Pub. No.: WO2017/091178
PCT Pub. Date: Jun. 1, 2017

(65) Prior Publication Data
US 2018/0043311 A1 Feb. 15, 2018

(30) Foreign Application Priority Data
Nov. 23, 2015 (TR) ............................... a 2015 14718

(51) Int. Cl.
*B01D 69/12* (2006.01)
*B01D 61/00* (2006.01)
(Continued)

(52) U.S. Cl.
CPC ......... *B01D 69/125* (2013.01); *B01D 61/002* (2013.01); *B01D 63/065* (2013.01);
(Continued)

(58) Field of Classification Search
CPC .. B01D 69/125; B01D 61/002; B01D 63/065; B01D 69/02; B01D 69/10; B01D 71/42; B01D 71/56; D01D 5/0007; D07B 7/14
See application file for complete search history.

(56) References Cited

U.S. PATENT DOCUMENTS

2008/0197071 A1* 8/2008 Lee ..................... B01D 61/027
210/500.38

FOREIGN PATENT DOCUMENTS

WO WO2007018393 A1 2/2007
WO WO2012102678 A1 8/2012

OTHER PUBLICATIONS

Ryan W. Holloway et al, Forward osmosis for concentration of anaerobic digester centrate[J]. Water Research 41 (2007) 4005-4014.
(Continued)

*Primary Examiner* — Daniel McNally
(74) *Attorney, Agent, or Firm* — Bayramoglu Law Offices LLC

(57) ABSTRACT

The invention relates to obtaining a nanofiber membrane by coating a hollow braided rope (3) with a nanofiber layer (2), to the usage of said tubular nanofiber membrane as a support layer membrane, and to the fabrication of forward osmosis membrane by coating the surface thereof with thin composite film (1). Particularly, a tubular nanofiber forward osmosis membrane used in water & waste water treatment and desalination processes with high water flux, low reverse salt flux, as well as a low tendency of fouling, and the manufacturing method thereof are disclosed herein.

17 Claims, 4 Drawing Sheets

(51) Int. Cl.
- B01D 63/06 (2006.01)
- B01D 69/10 (2006.01)
- B01D 71/56 (2006.01)
- B01D 71/42 (2006.01)
- B01D 69/02 (2006.01)
- D01D 5/00 (2006.01)
- D07B 7/14 (2006.01)

(52) U.S. Cl.
CPC .............. *B01D 69/02* (2013.01); *B01D 69/10* (2013.01); *B01D 71/42* (2013.01); *B01D 71/56* (2013.01); *D01D 5/0007* (2013.01); *D07B 7/14* (2013.01); *B01D 2323/39* (2013.01); *B01D 2325/40* (2013.01); *Y02A 20/131* (2018.01)

(56) References Cited

OTHER PUBLICATIONS

Chuyang Y. Tang, Coupled effects of internal concentration polarization and fouling on flux behavior of forward osmosis membranes during humic acid filtration.
Journal of Membrane Science 354 (2010) 123-133.
Wang R et al. Characterization of novel forward osmosis hollow fiber membranes[J]. Journal of membrane science, 2010, 355(1): 158-167.
Chun-Yu Wang et al. Asymmetric membrane capsules for delivery of poorly water-soluble drugs by osmotic effect.International Journal of Pharmaceutics 297 (2005) 89-97.
Ka Yu Wang et al. Polybenzimidazole (RBI) nanofiltration hollow fiber membranes applied in forward osmosis process.Journal of Membrane Science 300 (2007) 6-12.
Karen Gerstandt et al.Membrane processes in energy supply for an osmotic power plant.Desalination 224 (2008) 64-70.
Qian Yang et al. Dual-Layer Hollow Fibers with Enhanced Flux As Novel Forward Osmosis Membranes for Water Production.Environ, Sci. Technol. 2009, 43, 2800-2805.
Wang K Y, Ong R C, Chung T S. Double-skinned forward osmosis membranes for reducing internal concentration polarization within the porous sublayer[J ].
Industrial & Engineering Chemistry Research, 2010, 49(10): 4824-4831.
M. Sairam et al. Method for the preparation of cellutose acetate flat sheet composite membranes for forward osmosis—Desalination using MgSO4 draw solution.
Desalination 273 (2011) 299-307.
Gang Han et al. Thin-film composite forward osmosis membranes with novel hydrophilic supports for desalination.Journal of Membrane Science 423-424(2012) 543-555.

Yaqin Wang et al.Preparation of polyethersulfone/carbon nanotube substrate for high-performance forward osmosis membrane. Desalination 330(2013) 70-78.
Miao Tian et al. Preparation of polyamide thin film composite forward osmosis membranes using electrospun polyvinylidene fluoride (PVDF) nanofibers as substrates.
Separation and Purification Technology. 118(2013) 727-736.
Shuren Chou et al. Characteristics and potential applications of a novel forward osmosis hollow fiber membrane. Desalination 261 (2010) 365-372.
Ngai Yin Yip et al. High Performance Thin-Film Composite Forward Osmosis Membrane. Environ. Sci. Technol. 2010, 44, 3812-3818.
Qi Saren et al. Synthesis and Characterization of Novel Forward Osmosis Membranes based on Layer-by-Layer Assembly. Environ. Sci. Technol. 2011, 45, 5201-5208.
Jason T. Arena et al.Surface modification of thin film composite membrane support layers with polydopamine: Enabling use of reverse osmosis membranes in pressure retarded osmosis. Journal of Membrane Science 375 (2011) 55-62.
Lin Luo et al. Novel thin-film composite tri-bore hollow fiber membrane fabrication for forward osmosis. Journal of Membrane Science 461(2014)28-38.
Nhu-Ngoc Bui et al. Electrospun nanofiber supported thin film composite membranes for engineered osmosis. Journal of Membrane Science 385-386 (2011) 10-19.
William A. Philip et al. Reverse Draw Solute Permeation in Forward Osmosis: Modeling and Experiments. Environ. Sci. Technol. 2010, 44, 5170-5176.
Kai Yu Wang et al. Developing Thin-Film-Composite Forward Osmosis Membranes on the PES/SPSf Substrate Through Interfacial Polymerization. AIChE Journal. Mar. 2012 vol. 58, No. 3.
Panu Sukitpaneenit et al.High Performance Thin-Film Composite Forward Osmosis Hollow Fiber Membranes with Macrovoid-Free and Highly Porous Structure for Sustainable Water Production. Environ. Sci. Technol. 2012, 46, 7358-7365.
Satinderpal Kaur et al, Formation and characterization of polyamide composite electrospun nanofibrous membranes for salt separation, Journal of Applied Polymer Science, vol. 124, No. S1 Jun. 25, 2012. pp. E205-E215, XP055338086, US ISSN:0021-8995, DOI:10.1002/app.36375 p. 205-208.
Nhu-Ngob Bui et al. Hydrophilic Nanofibers as New Supports for Thin Film Composite Membranes for Engineered Osmosis. Environmental Science&Technology. vol. 47. No. 3 Feb. 5, 2013, pp. 1761-1769, XP05337938 US ISSN:0013-936X DOI :10.1021/es304215g.
Satinderpal Kaur et al. Influence of electrospun fiber size on the separation efficiency of thin film nanofiltration composite membrane. Journal of Membrane Science. vol. 392-393, Mar. 1, 2012, pp. 101-111, XP055337943, NL ISSN:0376-7388.

* cited by examiner though the less said flux is, the more optimal the FO membrane. Further, in case the solute used in the draw solution is costly, the more the flux permeating to the feed side, the less cost-efficient the system is. Also in biological systems salt accumulation causes the inhibition of process.

MANUFACTURING OF A NANOFIBER FORWARD OSMOSIS MEMBRANE WITH TUBULAR SHAPE

CROSS REFERENCE TO RELATED APPLICATIONS

This application is the national phase entry of International Application No. PCT/TR2016/050411, filed on Nov. 1, 2016, which is based upon and claims priority to Turkey Patent Application No. 2015/14718, filed on Nov. 23, 2015, the entire contents of which are incorporated herein by reference.

TECHNICAL FIELD

The invention relates to obtaining a nanofiber membrane (11) by coating a hollow braided rope (3) with a nanofiber layer (2), to the usage of said tubular nanofiber membrane (11) as a support layer membrane, and to the fabrication of forward osmosis membrane by coating the surface thereof with a thin composite film (1). Particularly, a tubular nanofiber forward osmosis membrane, which is used in water and waste water treatment and has a high water flux and a low reverse salt flux, as well as having a low tendency of fouling, and the manufacturing method thereof are disclosed herein.

PRIOR ART

Osmosis is a physical process, which is defined as the movement of the solvent across the selective permeable membrane with the effect of osmotic pressure. Osmotic pressure is the pressure resulted from the concentration difference between two sides for example salty water and low-salt water through which the water molecules are transported from the side of low mineral content water (low-salt water) to the side of higher mineral content (draw solution). The mentioned sides are separated by a semi-permeable membrane and the osmotic pressure is directly proportional to the mineral concentration difference of both sides. Selective permeable membrane, in turn, serves as a barrier which is permeable to the solvent (water), while impermeable to the solute. Contrary, by reverse osmosis process, the water molecules are transferred to the low salt content side by overcoming of osmotic pressure which is counted among high pressure systems. In osmotic process, no energy is required except the circulation of draw solution since the driving force allowing substance movement is the osmotic pressure. Therefore, it has begun to be used as a complemental process to the reverse osmosis process utilized in water & wastewater treatment and desalination processes, and has been called as forward osmosis (natural osmosis) in the related field.

Forward osmosis (FO) process, compared to the conventional membrane systems such as reverse osmosis (RO) nanofiltration (NF), ultrafiltration (UF) and microfiltration (MF), is a novel membrane process which has begun to be preferred in desalination, water treatment and waste water treatment applications owing to the advantages thereof at the same time, for example it requires less energy consumption, high discharge water quality and less fouling tendency, concentrate management.

In osmotic membrane systems where osmotic pressure is used as the driving force, the amount of salt permeating from the draw solution side to the feed side should be minimized in order to ensure efficient maintainability of the process. There is no semipermeable membrane that completely prevents the draw solution from permeating to the feed side; and yet, the less said flux is, the more optimal the FO membrane. Further, in case the solute used in the draw solution is costly, the more the flux permeating to the feed side, the less cost-efficient the system is. Also in biological systems salt accumulation causes the inhibition of process.

Another aim of the forward osmosis process is to ensure that the permeability flux of the feed solution to the concentrated solution is high. The fact that the flux is high, in turn, is only possible when membrane blockage tendency is reduced and concentration polarization is minimized. In osmotically driven membrane processes, concentration polarization results from the concentration difference between the draw solution and the feed solution. In FO processes, both internal and external concentration polarizations may occur. Typically, external concentration polarization occurs on the surface of the support and active layers while internal concentration polarization occurs inside of the porous support layer. The flux-reducing effect of the external concentration polarization can be eliminated by increasing flow turbulence or flow rate, or optimizing water flux; on the other hand, internal concentration polarization may be realized by reducing the tortuosity of the support layer, or displacing facing surface of the feed and draw solutions. However, the latter alternative may increase the fouling tendency of the membrane, as reported by Holloway et al. (2007), Tang et al. (2010), and Wang et al. (Wang R, Shi L, Tang C Y, et al. Characterization of novel forward osmosis hollow fiber membranes [J]. Journal of membrane science, 2010, 355(1): 158-167.).

Most FO membranes have an asymmetrical structure formed of two different layers, i.e. active layer and support layer. While the active layer is typically dense and selective, porous support layer provides mechanical strength. Due to said asymmetrical structure, the properties of both the support layer, and the selective active layer must be taken into consideration while developing FO membranes. The earlier studies on forward osmosis tested various materials including animal skins, nitrocellulose, rubber, porcelain, etc. to be used as a membrane. After 1960s, when Loeb-Sourirajan had developed membrane for the first time, reverse osmosis membranes were used in forward osmosis applications few in number. In parallel with the developments in polymer science and nanotechnology, in the recent studies focusing on the manufacturing and development of FO membrane with a view to enhance the performance of membranes regarding the limiting aforementioned factors and performance parameters. Different materials and manufacturing methods have been developed for the manufacturing of support and active layers. Among these, the following can be cited as the membrane formation: capsule wand (Wang et al., 2005), hollow fiber (Wang et al., 2007), flat sheet cellulose acetate (Gerstandt et al., 2008), two layer hollow fiber (Yang et al., 2009), cellulose acetate flat sheet (Wang K Y, Ong R C, Chung T S. Double-skinned forward osmosis membranes for reducing internal concentration polarization within the porous sublayer [J]. Industrial & Engineering Chemistry Research, 2010, 49(10): 4824-4831.), flat sheet composite (Sairam et al., 2011), flat sheet thin-film composite sulfonated polyetherketone (Han et al., 2012), carbon nanotube (CNT)-reinforced hollow fiber (Wang et al., 2013), flat sheet nanofiber (Tian et al., 2013); cellulose acetate as membrane material (Wang et al., 2005), polybenzimidazole (PBI) (Wang et al., 2007), polyether sulfone (PES) (Wang et al., 2007), (Chou et al., 2010), polysulfone (PSF) (Yip et al., 2010), polyacrylonitrile (PAN) (Saren et al., 2011), polydopamine modified PSF (Arena et al., 2011), polyvinylidene fluoride (PVDF) (Tian et al., 2013), matrimid (Luo et al., 2014); on the other hand, immersion plating-phase transformation (Wang et al., 2005), dry nozzle-wet transformation process (Wang et al., 2007), phase transformation and interfacial polymerization (Yip et al., 2010), electrospinning and interfacial polymerization (Bui et al., 2011), Loeb-Sourirajan wet phase transformation process and interfacial polymerization (Han et al., 2012) can be cited as FO membrane manufacturing methods.

Commercially available FO membrane manufacturers can be listed as HTI, Oasys Water, Porifera, and Aquaporin. Hydration Technology Innovations (HTI) produces cellulose triacetate and polyamide thin film composite membrane, while Oasys Water and Porifera produce thin film composite membrane; as for Aquaporin, it produces biomimetic FO membrane.

In literature, FO membranes are characterized by selectivity which is calculated through the ratio between reverse salt flux and water flux (Js/Jw). The reverse salt flux is the amount of solute passing through the membrane from draw solution side to the feed side per membrane area per time and the water flux is defined through the amount of water passing through the membrane from feed side to draw solution side per membrane area per time. FO membrane with the lowest Js/Jw ratio is the one with the highest performance. For instance, Phillip et al. (2010), in a study in which they used commercial flat sheet CTA FO membrane (HTI) and 2 M NaCl draw solution, obtained a 13 LMH (l/m$^2$/h) water flux and 10.5 GMH (g/m$^2$/h) reverse salt flux, calculating the Js/Jw to be 0.80 g/L. Similarly, Wang et al. (2012) obtained 13 LMH water flux, thereby achieving a lower reverse salt flux and a Js/Jw ratio of 0.27, by means of using flat sheet PES/SPSF FO membrane and 0.5 M NaCl draw solution. Sukipaneenit et al. (2012) utilized PES support layer thin film composite hollow fiber FO membrane and 2 M NaCl solution as draw solution, obtaining 34.1 LMH water flux, 7.10 GHM reverse salt flux, and a Js/Jw ratio of 0.20.

Nanofiber membranes, which have been reported to have less manufacturing costs when compared to conventional membrane manufacturing methods, have also begun to be used as the support layer of the FO membrane. In one of those studies, Tian et al. (2013) obtained 28 LMH water flux and 12.9 GMH reverse salt flus (Js/Jw: 0.46 g/L) by means of a nanofiber flat sheet FO membrane using PVDF polymer.

In literature, there exist applications of fiber membranes with flat layer and hollow fiber properties, as well as flat layer nanofiber; however, the manufacturing and application of a nanofiber with a tubular structure do not exist. Hollow fiber membranes can provide a larger membrane area in the same packaging volume compared to flat layer membranes. It is also known in literature that nanofibers prevent internal concentration polarization due to the turbulence thereof, and that they provide high flux.

SUMMARY OF THE INVENTION

The object of the invention is to manufacture a membrane with tubular support layer consisted of electrospun nanofibers on which selective polyamide layer is coated which will provide relatively high water flux and low reverse salt flux for an FO membrane by manufacturing nanofibers from any polymer (PAN is preferred in the present invention) using electrospinning method, and to transform the support layer into forward osmosis membrane by coating the same with a thin composite film layer (1) by means of interfacial polymerization method.

Another object of the invention is to produce a tubular nanofiber-polyamide FO membrane with high water flux, low reverse salt flux and large membrane area in packaging volume, aimed to use in water filtration.

And another object of the invention is to produce an FO membrane which is industrially easy to produce and use and which has low manufacturing and usage costs.

DETAILED DESCRIPTION OF THE INVENTION

Figure 1:
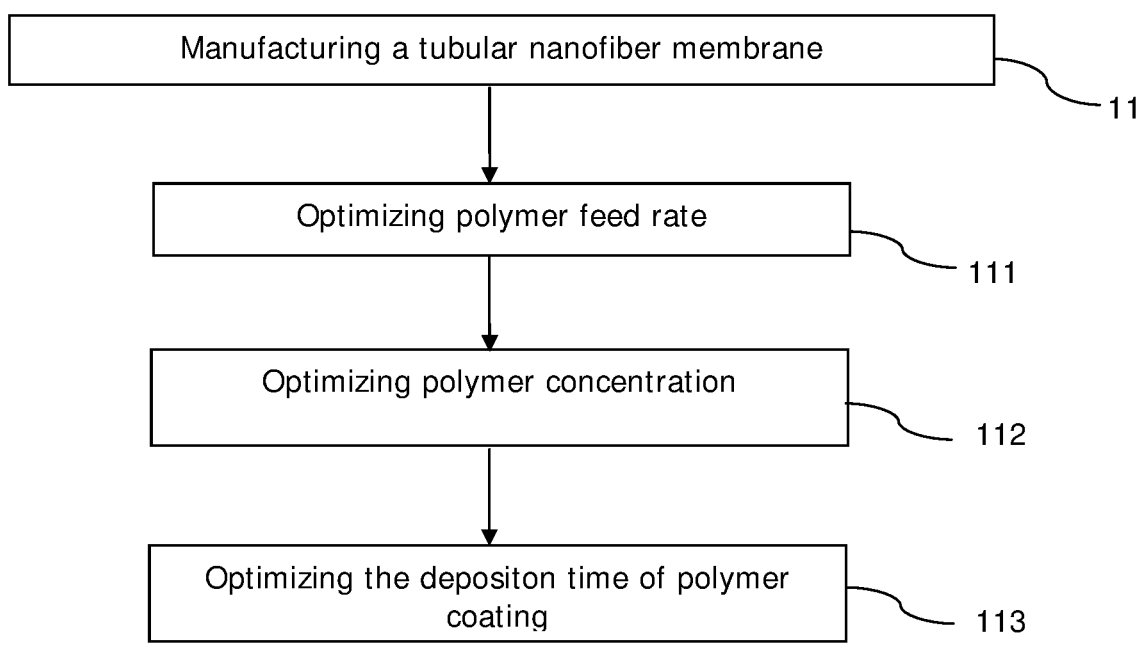
FIG. 1: Manufacturing method of the tubular nanofiber support layer of the FO membrane with electrospinning according to the invention.
Figure 2:
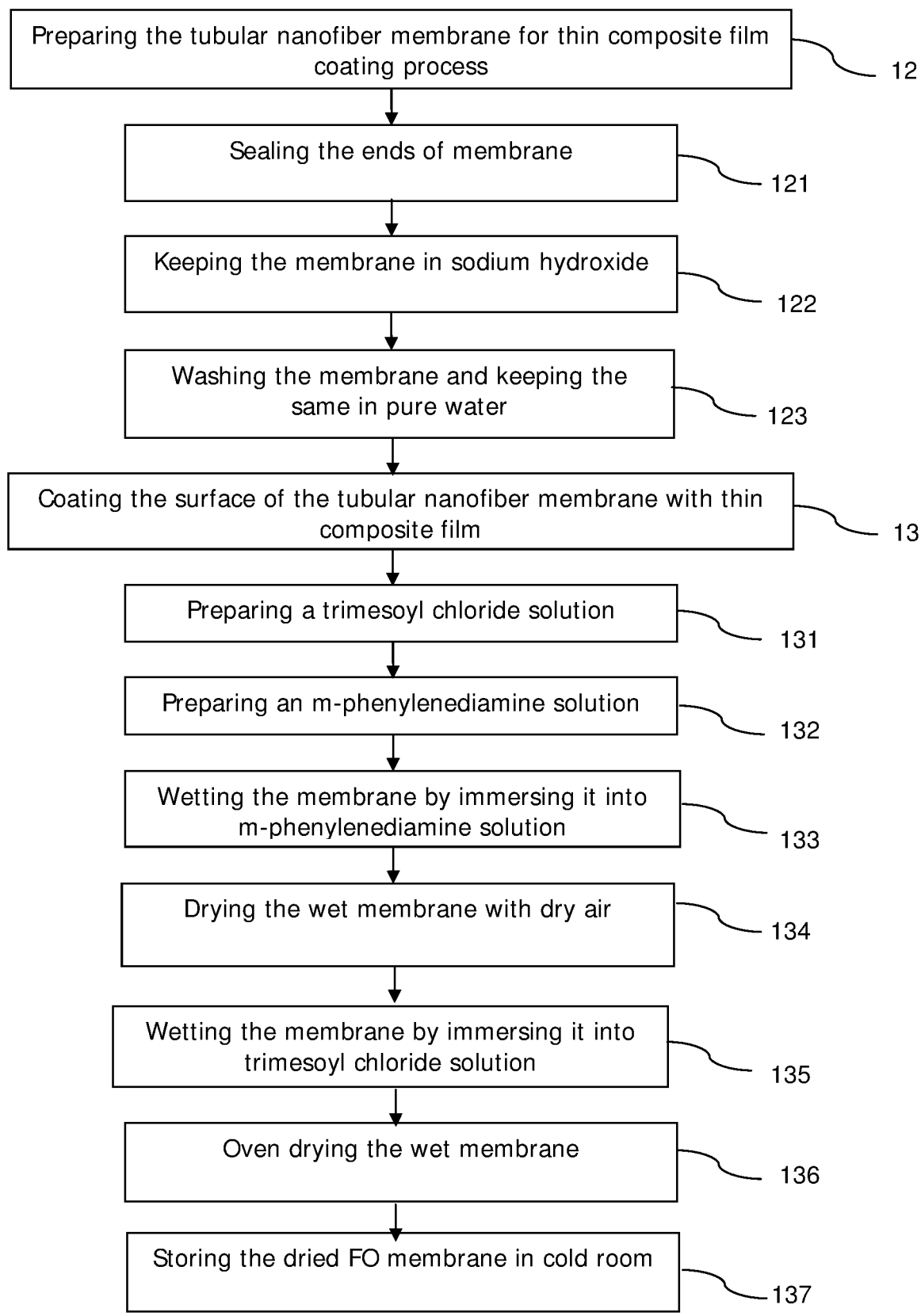
FIG. 2: Transformation method of the tubular nanofiber support layer according to the invention into FO membrane.
Figure 3:
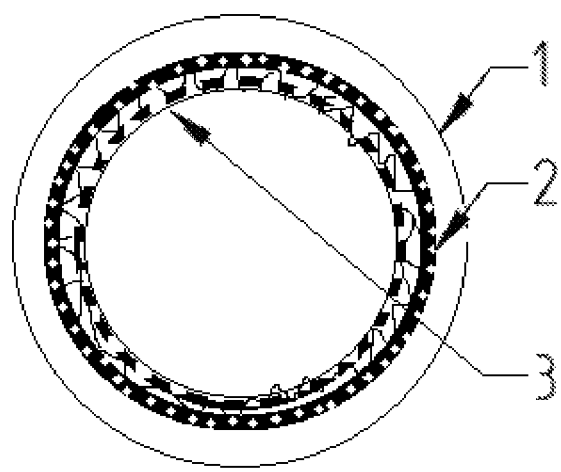
FIG. 3: The cross-sectional view of the tubular nanofiber FO membrane according to the invention, showing thin composite film (1) layer, nanofiber layer (2), and hollow braided rope (3) parts thereof.

The invention relates to a method of manufacturing a nanofiber support layer by subjecting a hollow braided rope (tubular) support layer to electrospinning, and coating the surface of the thus produced nanofiber support layer with thin composite film (1), thereby transforming it into a forward osmosis membrane used for water & wastewater treatment and desalination processes.

The manufacturing method (10) according to the invention comprises the following process steps;

Manufacturing a tubular nanofiber membrane (11),
  optimizing polymer feed rate (111),
  optimizing polymer concentration (112),
  optimizing the duration of polymer coating time (113),
Preparing the tubular nanofiber membrane for thin composite film (1) coating process (12),
  sealing the ends of membrane (121),
  keeping the membrane in sodium hydroxide (122),
  washing the membrane and keeping the same in pure water (123),
Coating the surface of the tubular nanofiber membrane with thin composite film (1) (13),
  preparing a trimesoyl chloride solution (131),
  preparing an m-phenylenediamine chloride solution (132),
  wetting the membrane by immersing it into m-phenylenediamine solution (133),
  subjecting the wet membrane to air drying (134),
  wetting the membrane by immersing it into trimesoyl chloride solution (135),
  oven drying the wet membrane (136), and
  storing the dried FO membrane in cold room (137).

In the method according to the invention, for manufacturing the tubular nanofiber membrane, first electrospinning parameters are optimized and the decision as to the optimal value is determined by analyzing scanning electron microscope (SEM) image after each parameter experiment. It is aimed to obtain surfaces in which the nanofibers exhibit smooth, continuous, and homogeneous distribution, free of droplets. Moreover, the thickness of the nanofiber layer (2) on the rope should also be optimized so that thermal post treatment can be effective at the point where the nanofibers contact with the hollow braided rope, and that nanofibers can adhere properly to the rope support. The primary factors having an effect on the thickness of the nanofiber layer (2) are the amount of polymer in the feed solution and the duration of coating period. As the tubular nanofiber membrane will be transformed into an FO membrane by thin composite film (1) coating, it is required that its porosity shall be at the levels of MF-UF, and that the surface of the thin composite film (1) is as smooth as possible so that it will be generated properly so as to form a semi-selective permeable membrane.

The rope which is coated by nanofibers is the so-called hollow braided rope (3), which resembles shoelaces. Hollow braided (tubular) rope is a material used for electrical insulation. It is made of glass fiber in a tubular form with a diameter of 2-50 mm and used after absorbing insulating varnish thereon, and it is produced at various diameters. In the preferred embodiment of the invention, unvarnished hollow braided rope with a diameter of 2 millimeters (mm) is used. Said tubular rope serves for both increasing mechanical strength and supporting nanofiber layer (2). In the method according to the invention, the support layer is coated with nanofiber layer (2) by electrospinning method. The product (support layer) obtained by coating with nanofiber layer (2) is a membrane having nearly microfiltration/ultrafiltration properties.

Electrospinning method is based on the principle of manufacturing nano-sized fibers from a charged polymer solution in a high electric field. There exist electrospinning devices of various dimensions intended for nanofiber manufacturing. These devices are formed of a set of nozzles for delivering the polymer feed to the electric field and a rotating collector for collecting the nanofibers thereon. In the method according to the invention, a hollow braided rope (3), which is to be coated by nanofiber, with a length of 25 cm and diameter of 2 mm is covered onto a conductive rod with a diameter of 1.5 mm. Said dimensions may vary as desired.

The solution from which the nanofiber is produced is prepared by dissolving the polymer in a suitable solvent (it is preferred in the present invention to dissolve PAN polymer in a DMF solvent), wherein the solution becomes ready in about 24 h. During this time period, the solution is mixed until a light yellow and homogeneous appearance is achieved.

In the method according to the invention, it is required to optimize electrospinning parameters first in order to produce the tubular nanofiber membrane (11). First, all of the other parameters are kept constant so as to optimize the rate of polymer feed solution (11). The amount of polymer in DMF/PAN solution is 10% by weight. Adjustments are made such that the duration of coating is 25 min., the distance between the nozzle and rope is 15 cm, the applied voltage is 20 kV, post treatment temperature is 150° C., and the duration of post treatment is 120 min. Operating conditions regarding, similar studies are presented in Table 1. Feed rate of 8 mL/h, during which the nanofiber with the desired surface is obtained subsequent to trials performed for 6-7-8-9-10-11-12-13-14-15 mL/h feed rates, is set and polymer concentration is optimized (112), again keeping the operating parameters constant. To that end, 10% PAN/90% DMF solution (w/w) by which the nanofiber with the desired percent is achieved, among the trials in which the percent of PAN within the solution of DMF/PAN mixture is 8-9-10-11-12, is prepared. As a final step of manufacturing tubular nanofiber membrane (11), in order to optimize the duration of polymer coating time (13), the coating time of 20 min by which the nanofiber with the desired surface is achieved is set, from the trials of coating time including 20-40-60-80-100 min for coating the nanofiber layer (2) onto the rope by keeping the other operating parameters constant. SEM and surface analysis performed on the samples taken from the tubular nanofiber membrane produced in the preferred conditions of the invention; i.e. a feed rate of 8 mL/h, a PAN con. 10% in 90% DMF (w/w), and a coating time of 20 min., showed that fibers with a diameter of 300-400 nanometers were formed and a suitable support layer to be used in FO membrane was achieved.

In the method according to the invention, the tubular nanofiber membrane is subject to pre-treatment in a way to make the tubular nanofiber membrane ready for thin composite film (1) coating process (12). In the preferred method of the invention, the thin composite film (1) is formed as a polyimide active layer. Since the thin composite film (1) will be coated onto the exterior surface of the tubular membrane, both ends of the membrane should be sealed so that coating solutions cannot penetrate into the membrane (121). Various adhesives and materials can be used for sealing the ends. In the present study, sealing is preferably performed with hot silicone. The membranes the ends of which are thus sealed are kept in 2M sodium hydroxide (NaOH) solution at RT (Room Temperature) for 2 h (122). Adhesion interaction between polyamide active layer and PAN nanofibers is increased by ionic and covalent bonds by way of hydrolyzing NaOH and PAN, transforming cyano (—C≡N) group therein to carboxylic group (—COOH). After 2 h, tubular nanofiber membrane is washed with pure water and kept in pure water until the coating is made (123).

Monomer components of the solution prepared for coating (13) the surface of the tubular nanofiber membrane with thin composite film (1) are trimesoyl chloride (TMC) and m-phenylenediamine (MPD). TMC solution is prepared as a weight/volume (w/v) solution (131). As soon as TMC is weighted, it is added into the hexane being mixed without allowing moistening in the former, and used after being completely dissolved. Said solution is mixed at high rpm until the end of coating process.

MPD solution is adjusted as a weight/weight (w/w) solution and prepared by ultrapure water, through which nitrogen gas is passed for 10 min (132). The membrane, the pre-treatment of which is completed is immersed into MPD solution first, and kept therein for a while (133). The membrane having been wetted with MPD is subject to low-flow air drying for a while (134). The membrane having been dried is immersed into TMC solution and kept for a while (135). Prior to oven drying, the membrane removed from TMC solution is kept under ambient air for 1 min, and then being subject to oven drying for a while (136). The membrane taken from the oven (i.e. forward osmosis membrane) is put into ultrapure water and stored in cold room in a covered manner until use (137).

During the manufacturing of the tubular nanofiber forward osmosis membrane according to the invention, three parameters were taken as a basis for optimizing thin composite film (1) coating conditions: the time period of keeping in MPD (133) is 15-30 min, the time period of air drying (134) is 30-60 s, and the time period of keeping in TMC (135) is 2-4 min. More than one forward osmosis membrane have been produced and SEM analyses, as well as water and reverse salt flux experiments, have been conducted in accordance with these parameters. A closed module with two inlets and two outlets was made for each membrane; pure water is permeated across membrane exterior, while permeating NaCl draw solution with 0.5 M water across membrane interior; and each membrane was run on a laboratory scale forward osmosis test equipment for 180 min, monitoring the efficiency of the osmosis process regarding the water and reverse salt flux. Subsequent to these analyses, it was observed that the best results were obtained from the membrane which was subject to the present processes as follows: keeping in 3.5% (w/) MPD solution for 15 min, followed by air drying for 30 s, keeping in 0.15% (w/v) TMC solution for 4 min, and then air drying under ambient air for 1 min, finally performing oven drying at 70° C.

equilibrated, water flux was determined taking the weight change in the draw solution into account. Reverse salt flux towards the feeding side, on the other hand, was monitored at predetermined periods by immersing conductivity probe. In forward osmosis equipment, reverse salt flux can be found on the basis of mass balance:

$$c_F(V_{FO} - J_w \times A_m \times t) = J_s \times A_m \times t \quad (1)$$

Wherein:
$c_F$=NaCl concentration in feed solution (g/L)

TABLE 1

Operating conditions for nanofiber membrane manufacturing in literature.

| Membrane Type | Polymer type | Amount of polymer (%) | Solvent Type | Feed Rate (mL/h) | Deposition Time (min) | Distance between the nozzle and rope (cm) | Voltage (KV) | Post treatment temperature (° C.) | Post treatment duration | Ref. |
|---|---|---|---|---|---|---|---|---|---|---|
| Flat sheet | PSF and PES | 25 and 20 | DMF and NMP (a solvent system) | 0.6 | ND | 16 | 27.5 | ND | ND | Bui et al. 2011 |
| Flat sheet | PVDF | 8 | DMF | 1.8 | ND | 12-15 | 27-30 | Oven drying at 50-150° C. | 1 h hot press overnight | Tian et al. 2013 |
| Flat sheet | PAN/CNT | 13/0.25 | DMF | ND | ND | 15 | 20 | ND | ND | P. Heikkilä et al. 2009 |
| Flat sheet | Nylon 6 | 15-25 | Formic acid | 0.2-0.3 | ND | 5-11 | 12-18 | Ambient temperature | 24 h | Chowdhury et al. 2010 |
| Flat sheet | PAN | 4-12 | DMF | 0.6-1.2 | ND | 10-18 | 14-20 | ND | ND | Yoon et al. 2006 |
| Flat sheet | PAN | 14 | DMF | 0.293 | ND | 20 | 11 | ND | ND | Ravandi et al. 2011 |
| Flat sheet | PAN | 4-10 | DMF | 0.5 | ND | 25 | 40 | ND | ND | Qin et al. 2006 |
| Flat sheet | PAN | 3-10 | DMF/H$_2$O | 1.2 | ND | 13 | 15 | ND | ND | Yu et al. 2010 |
| Flat sheet | PVDF | 5 | DMF/Acetone | | 180 | 12 | 28 | 60-170° C. | overnight-1 h | Liao et al. 2013 |
| Flat sheet | PVDF | 18 | DMF | 2 | ND | 18 | 18 | RT | 24 h | Feng et al. 2008 |
| Flat sheet | PSF | 20 | DMF | 1.5 | 30 | 15 | 11 | RT | 48 h | Liu et al. 2014 |
| Tubular | PAN | 10 | DMF | 8 | 20 | 15 | 20 | 170° C. | 120 min | The method according to the invention |

Water flux (Jw) and reverse salt flux (Js) of the membranes tested in laboratory scale forward osmosis setup is calculated from the following equation (1). One of the equivalent peristaltic pumps in the setup was used for the draw solution, and the other for feed water (pure water). Data were collected every 15 min. A digital balance was used to weigh the increase on the draw solution side. The conductivity increase in the pure water (feed) side was used to calculate the reverse salt flux and measured with conductivity measurement device. At the start of the experiment, first draw solution was run for 10 min., and then feed solution circulation was activated and run for 30 min. until the system equilibration is provided. Once the system is $V_{FO}$=first volume of the feel solution (l)
$J_w$=Measured water flux (LMH)
$A_m$=Membrane area (m$^2$)
t=time (h)
$J_s$=Reverse salt flux (GMH)

Figure 4:
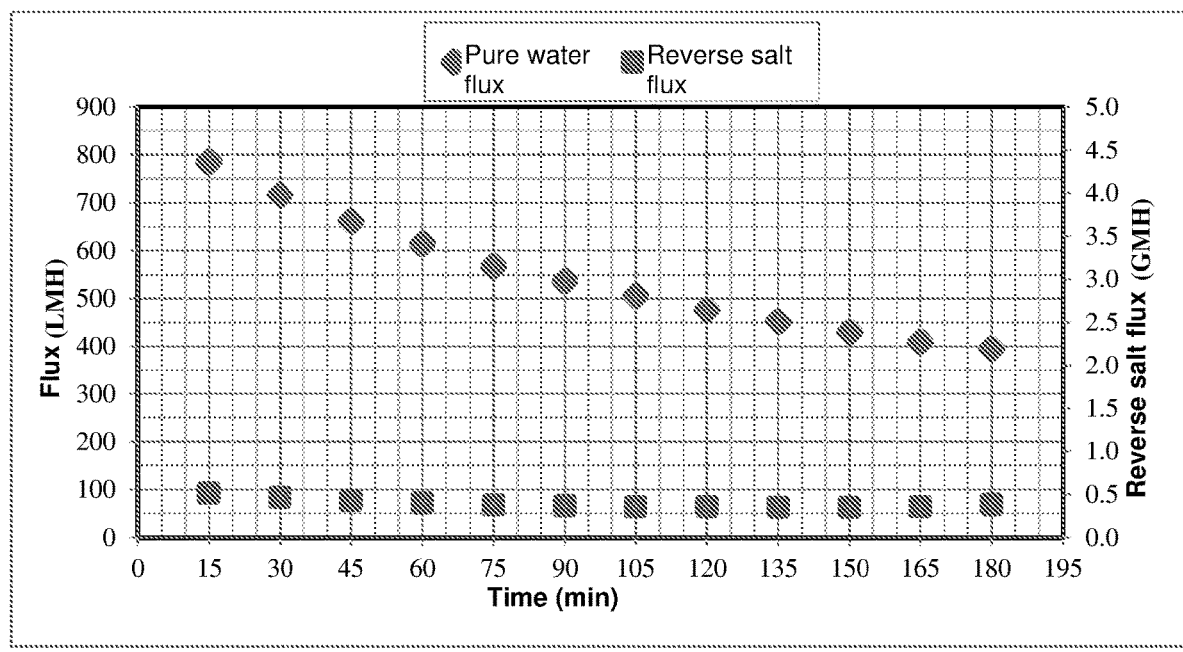
FIG. 4: The graph showing the changes in water and reverse salt fluxes of the tubular nanofiber forward osmosis membrane according to the invention.

The graph showing pure water flux and reverse salt flux of the membrane obtained with membrane manufactured under optimal manufacturing conditions is given in FIG. 4. Table 2 presents the values of other commercial membranes and tubular nanofiber forward osmosis membrane regarding the water flux, reverse salt flux and Js/Jw (water flux/reverse salt flux) which are used in literature as performance criteria of FO membranes.

TABLE 2

Comparison of the tubular nanofiber forward osmosis membrane manufactured according to the invention to the similar studies in literature.

| Membrane Type | Support Layer Polymer | Water Flux (LMH) | Reverse Salt Flux (GMH) | Js/Jw | Draw Solution Concentration | Reference |
|---|---|---|---|---|---|---|
| Hollow Fiber | PES | 22.5 | 2.8 | 0.12 | 0.5 M NaCl | Sukitpaneenit et al. 2012 |
| Hollow Fiber | PES | 32.1 | 6.2 | 0.19 | 2 M NaCl | Sukitpaneenit et al. 2012 |
| Hollow Fiber | PES | 34.1 | 7.1 | 0.20 | 2 M NaCl | Sukitpaneenit et al. 2012 |
| Hollow Fiber | PES | 34.5 | 9.9 | 0.28 | 2 M NaCl | Sukitpaneenit et al. 2012 |
| Hollow Fiber | PES | 13.5 | 1.8 | 0.13 | 0.5 M NaCl | Wang et al. 2010 |
| Hollow Fiber | PES | 18.5 | 1.5 | 0.08 | 0.5 M NaCl | Chou et al. 2010 |
| Flat sheet | PES/SPSF | 13.0 | 3.6 | 0.27 | 0.5 M NaCl | Wang et al. 2012 |

TABLE 2-continued

Comparison of the tubular nanofiber forward osmosis membrane manufactured according to the invention to the similar studies in literature.

| Membrane Type | Support Layer Polymer | Water Flux (LMH) | Reverse Salt Flux (GMH) | Js/Jw | Draw Solution Concentration | Reference |
|---|---|---|---|---|---|---|
| HTI Flat sheet | CTA | 13.0 | 10.5 | 0.80 | 2 M NaCl | Phillip et al. 2010 |
| Flat sheet | PSF | 13.9 | 5.3 | 0.38 | 2 M NaCl | Emadzadeha et al. 2014 |
| Flat sheet | PSF | 33.0 | 15.7 | 0.47 | 2 M NaCl | Emadzadeha et al. 2014 |
| Flat sheet | PSF | 9.5 | 3 | 0.31 | 0.5 M NaCl | Emadzadeha et al. 2014 |
| Flat sheet | PSF | 18.8 | 7.4 | 0.39 | 0.5 M NaCl | Emadzadeha et al. 2014 |
| CTA-HW (Commercial) | CTA | 9.0 | 5.3 | 0.58 | 0.5 M NaCl | J. Wei et al. 2011 |
| CTA-W (Commercial) | CTA | 5.0 | 2.9 | 0.58 | 0.5 M NaCl | J. Wei et al. 2011 |
| CTA-NW (Commercial) | CTA | 4.4 | 0.6 | 0.13 | 0.5 M NaCl | J. Wei et al. 2011 |
| Double-skinned flat sheet | CTA | 10.3 | 0.8 | 0.07 | 2 M $MgCl_2$ | Zhang et al. 2010 |
| Double-skinned flat sheet | CTA | 9.8 | 1.2 | 0.12 | 2 M $MgCl_2$ | Zhang et al. 2010 |
| Positively charged hollow fiber | Poly(amide-imide)-polyethyleneimine | 4.2 | 1.9 | 0.45 | 1.5 M $MgCl_2$ | Setiawan et al. 2011 |
| Positively charged hollow fiber | Poly(amide-imide)-polyethyleneimine | 11.7 | 3.9 | 0.33 | 1.5 M $MgCl_2$ | Setiawan et al. 2011 |
| NanoFiber - Flat sheet | PVDF | 11.6 | 3.5 | 0.30 | 1 M NaCl | Tian et al. 2013 |
| NanoFiber - Flat sheet | PVDF | 28.0 | 12.9 | 0.46 | 1 M NaCl | Tian et al. 2013 |
| Tubular NanoFiber | PAN | 395.1 | 0.38 | 0.001 | 0.5 M NaCl | The method according to the invention |

Apart from comparison with the values in literature, a commercial flat layer RFC-FO membrane was tested in order to confirm the efficiency of the lab scale forward osmosis test setup by means of which the tubular nanofiber forward osmosis membrane manufactured according to the method of the invention is tested also. The water flux and salt adhesion (18 LMH and 99.4, respectively) specified under the operating conditions in the commercial membrane guide was achieved.

The tubular nanofiber forward osmosis membrane according to the invention is industrially easy to produce; moreover, it becomes easy to use and cost-efficient by providing a module into which the membrane will be positioned.

The invention claimed is:

1. A manufacturing method of a tubular nanofiber forward osmosis membrane, comprising the steps of:
   (a) coating a tubular porous support layer with a nanofiber layer, and thus obtaining a tubular nanofiber membrane; and
   (b) coating a surface of the tubular nanofiber membrane with a thin composite film by using the tubular nanofiber membrane as a support layer membrane;
   wherein, a polymer used in manufacturing the nanofiber layer of the tubular nanofiber membrane is polyacrylonitrile (PAN);
   wherein the manufacturing method further comprises (b)' preparing the tubular nanofiber membrane for a thin composite film coating process before the step (b),
   wherein the step (a) comprises (i) optimizing a feed rate for the polymer, (ii) optimizing a concentration for the polymer, and (iii) optimizing a duration of a coating time for the polymer,
   wherein the step (b)' comprises (i) sealing ends of the tubular nanofiber membrane, (ii) keeping the tubular nanofiber membrane in sodium hydroxide, and (iii) washing and keeping the tubular nanofiber membrane in pure water, and
   wherein the step (b) comprises (i) preparing a trimesoyl chloride solution, (ii) preparing a m-phenylenediamine solution, (iii) wetting the tubular nanofiber membrane by immersing into the m-phenylenediamine solution, (iv) subjecting the tubular nanofiber membrane to air drying, (v) wetting the tubular nanofiber membrane by immersing into the trimesoyl chloride solution, (vi) oven drying the tubular nanofiber membrane to obtain the tubular nanofiber forward osmosis membrane, and (vii) storing the tubular nanofiber forward osmosis membrane in a cold room.

2. The manufacturing method of a tubular nanofiber forward osmosis membrane according to claim 1, wherein the m-phenylenediamine solution is obtained in 3.5% (w/w) by dissolving a m-phenylenediamine in pure water.

3. The manufacturing method of a tubular nanofiber forward osmosis membrane according to claim 2, wherein in the step (b)(iii), the tubular nanofiber membrane is kept in the m-phenylenediamine solution for 15 to 30 min.

4. The manufacturing method of a tubular nanofiber forward osmosis membrane according to claim 2, wherein in the step (b)(iv), the tubular nanofiber membrane is subjected to low-flow air drying for 30 to 60 s.

5. The manufacturing method of a tubular nanofiber forward osmosis membrane according to claim 1, wherein the nanofiber layer consists of electrospun nanofibers.

6. The manufacturing method of a tubular nanofiber forward osmosis membrane according to claim 5, wherein a material for the tubular porous support layer with the nanofiber layer is a hollow braided rope and the nanofiber layer is a support layer for the thin composite film.

7. The manufacturing method of a tubular nanofiber forward osmosis membrane according to claim 1, wherein the feed rate for the polymer is applied in a range of 6-15 mL/h.

8. The manufacturing method of a tubular nanofiber forward osmosis membrane according to claim 7, wherein the feed rate for the polymer is 8 mL/h.

9. The manufacturing method of a tubular nanofiber forward osmosis membrane according to claim 1, wherein an amount of polyacrylonitrile in a polyacrylonitrile/dimethylformamide solution is 8-12% by weight.

10. The manufacturing method of a tubular nanofiber forward osmosis membrane according to claim 9, wherein the amount of polyacrylonitrile in the polyacrylonitrile/dimethylformamide solution is 10% by weight.

11. The manufacturing method of a tubular nanofiber forward osmosis membrane according to claim 1, wherein the duration of the coating time for the polymer is 20 min, a distance between a nozzle of an electrospinning and the tubular porous support layer is 15 cm and an applied voltage is 20 kV.

12. The manufacturing method of a tubular nanofiber forward osmosis membrane according to claim 1, wherein the step (a) further comprises a thermal post treatment after coating; and a post treatment temperature is 120° C. and a post treatment duration is 120 min.

13. The manufacturing method of a tubular nanofiber forward osmosis membrane according to claim 1, wherein the duration of the coating time for the polymer is in a range of 20-100 min.

14. The manufacturing method of a tubular nanofiber forward osmosis membrane according to claim 1, wherein in step (b)'(ii), the tubular nanofiber membrane is kept in 2 M NaOH at RT for 2 h.

15. The manufacturing method of a tubular nanofiber forward osmosis membrane according to claim 1, wherein the trimesoyl chloride solution is obtained in 0.15% (w/v) by dissolving a trimesoyl chloride in hexane.

16. The manufacturing method of a tubular nanofiber forward osmosis membrane according to claim 1, wherein in the steps (b)(v) and (b)(vi), the tubular nanofiber membrane is kept in the trimesoyl chloride solution for 2 to 4 min, and subject to oven drying at 70° C. for 5 min, subsequent to being kept at an ambient air for 1 min.

17. A tubular nanofiber forward osmosis membrane produced according to claim 1.

* * * * *